Dec. 12, 1939. W. R. KING 2,182,873
REGULATOR VALVE
Filed July 6, 1936 3 Sheets-Sheet 1

W. R. KING
INVENTOR
BY Jesse R. Stone
Lester B. Clark
ATTORNEYS.

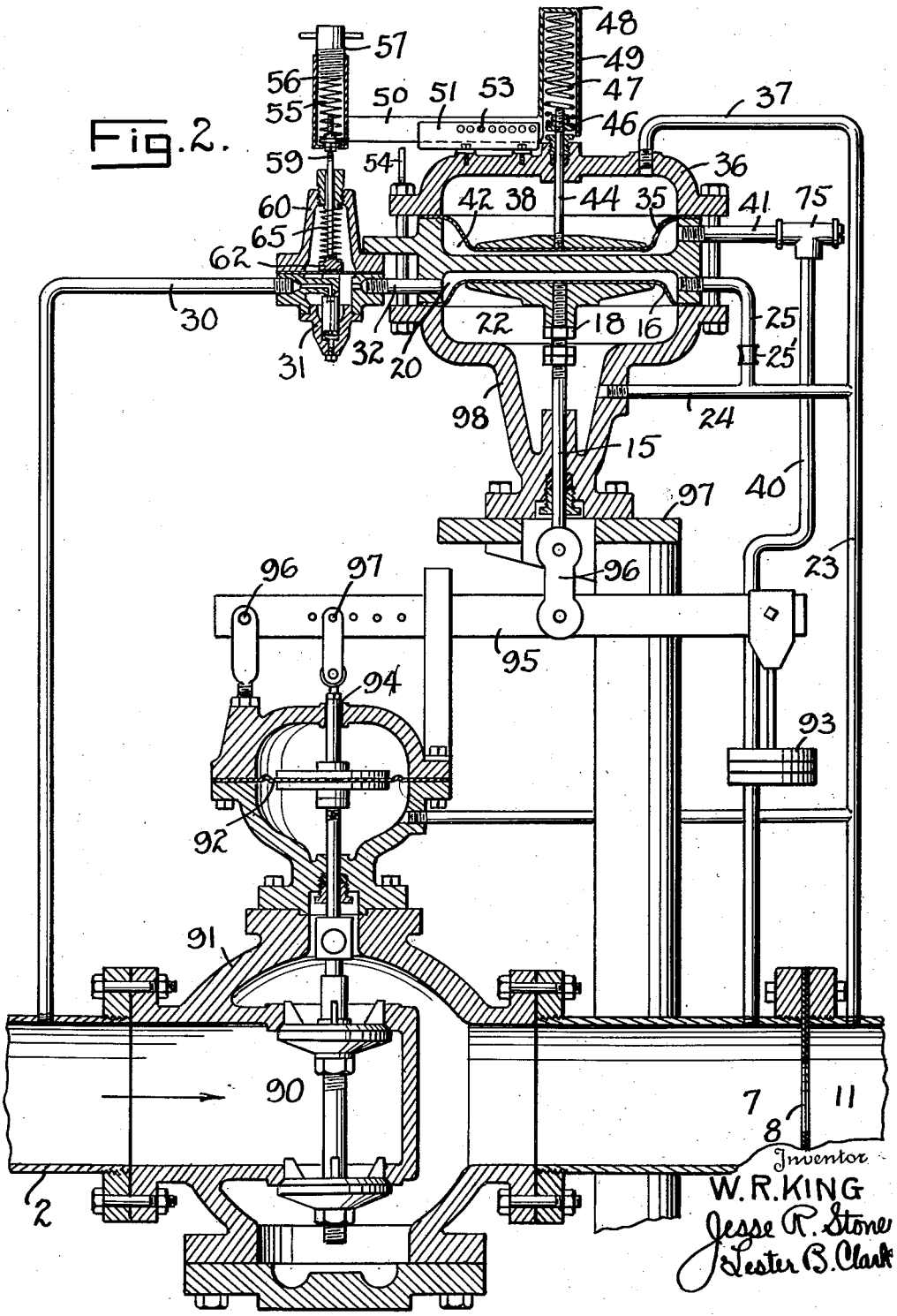

Dec. 12, 1939.　　　W. R. KING　　　2,182,873
REGULATOR VALVE
Filed July 6, 1936　　　3 Sheets-Sheet 3

Inventor
W. R. KING.
Jesse R Stone
Lester B Clark

By

Attorneys.

Patented Dec. 12, 1939

2,182,873

UNITED STATES PATENT OFFICE 2,182,873

REGULATOR VALVE

William R. King, Mineola, Tex.

Application July 6, 1936, Serial No. 89,004

8 Claims. (Cl. 50—16)

The invention relates to improvement in regulator valves and particularly in the method of operation thereof whereby a constant pressure can be maintained on a conducting pipe line at a considerable distance from the point of regulation.

The present system of regulation has been developed with a view to providing the control for the flow of gas or other compressible fluids where the consumption of fluid from the well or line varies so that the volume of fluid passed through the regulator must vary not only in accordance with the variation in the consumption but also to compensate for variation in pressure due to friction losses in the line caused by the variation and the rate of flow of the fluid through the pipe.

In order to illustrate exactly how the invention is to be applied assume that a pipe line is of considerable length and there is to be a pressure of 100 lbs. per square inch maintained at the outlet end of the line. In order to maintain this pressure of 100 lbs. per square inch on the outlet end it is necessary to maintain a pressure of 110 lbs. per square inch at the regulator valve, the difference being due to the friction loss in the line. These conditions are assumed when there is a minimum consumption of gas or fluid, or, as it may be more appropriately termed, a minimum load. Now assume that the load increases so that the pressure on the outlet drops below 100 lbs. The rate of flow through the line therefore immediately increases because the differential pressure between the outlet and regulator valve has increased. This increase in the rate of flow immediately results in a greater friction loss so that there will be an additional drop on the outlet end of the line if the pressure of the regulator is still maintained at 110 lbs. It seems obvious, therefore, that the pressure at the regulator must be increased not only to open the regulator valve to permit an increased volume of flow to compensate for the increase of load on the line but the regulator must also admit an additional volume of fluid to build up the pressure at the regulator valve to accommodate for the increased frictional loss. As an illustration, say that a peak load pressure of 120 lbs. would have to be maintained at the regulator in order to maintain a 100 lb. pressure at the outlet, the 10 lb. differential increase being necessary to overcome the frictional loss caused by the increased rate of flow to accommodate the peak load. If, however, the regulator was so constructed that when the load increased it immediately reacted to provide 120 lb. pressure, then there would be a hunting action of the regulator valve due to this sudden increase which would in turn result in a sudden decrease so that the pressure would build up and then drop below the required pressure which would create an unsatisfactory condition.

The present invention has been provided with a view of obtaining a lag in the operation of the regulator valve which will not only prevent the hunting operation but which is also adjusted or is capable of adjustment such that a constant pressure can be maintained on the outlet or directly in accordance with the load required.

It is one of the objects of the invention to provide a regulator for control valves so that a constant pressure can be obtained at any point in the pipe line adjacent thereto.

Another object of the invention is to provide a choke arrangement to damp the action of the increased pressure so that there will be a time lag which will permit the building up of the pressure gradually and a gradual reduction as well, so as to compensate for the friction loss occurring in the line due to the variation in flow.

Another object of the invention is to control the loading of the pilot valve of a pilot loaded regulator valve.

Another object of the invention is to provide a spring mechanism in combination with the control diaphragm so as to dampen the action of any other changes in pressure.

Another object of the invention is to provide a control mechanism which is adapted to be directed to adjusting control valves so as to obtain a uniform action thereof in maintaining a constant outlet pressure.

Other and further objects of the invention will be readily apparent when the following description is considered in connection with the accompanying drawings wherein:

Fig. 2 shows a form of the present invention which is applied to a control valve in order to regulate the operation thereof.

Figure 1:
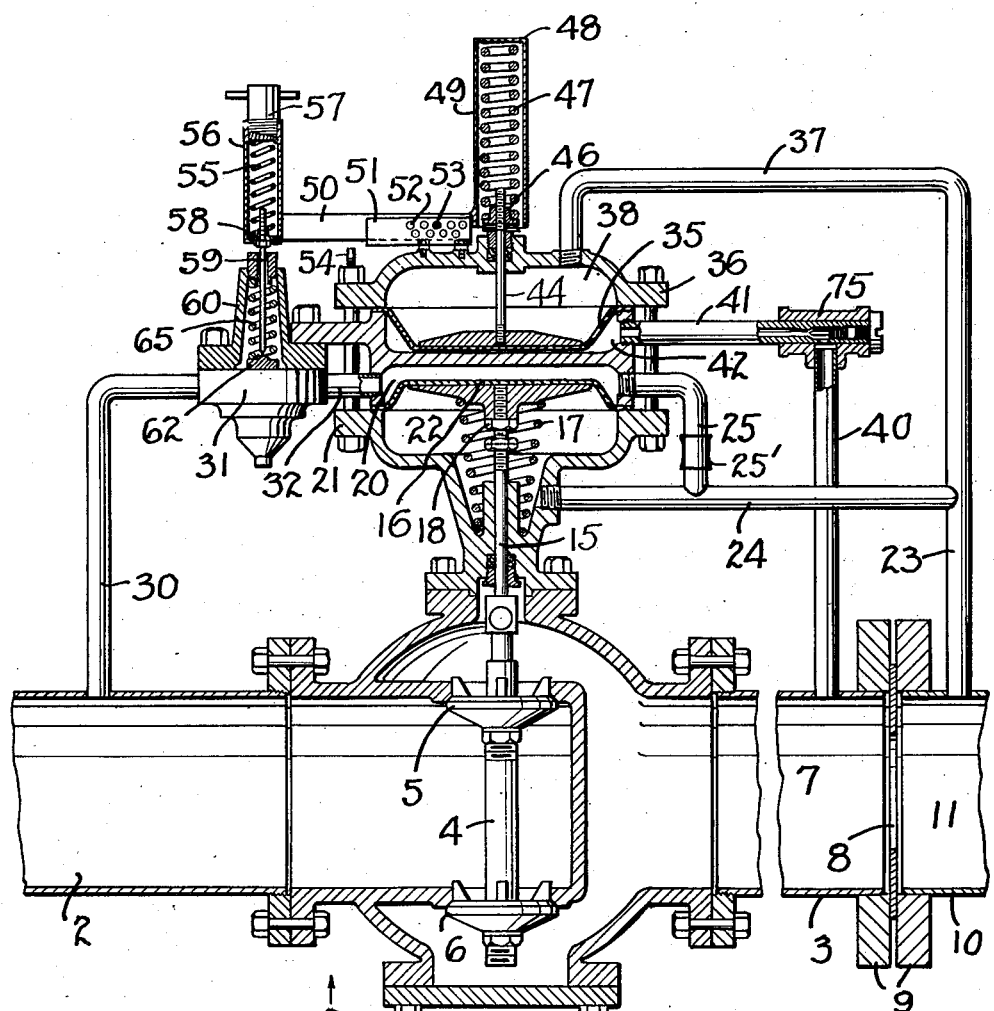
Fig. 1 is a vertical sectional view of the entire control assembly as applied to a fluid pressure line and illustrates the general arrangement and construction of the parts.

In Fig. 1 the high pressure line is indicated at 2, and fluid under relatively high pressure as compared with other parts of the line will be maintained therein.

The invention has particular application to long distance conductors for conveying gas and other compressible fluids wherein a high pressure is to be maintained in the line but where the pressure is to be reduced at various outlets of distributing lines. One such distributing line is indicated generally at 3 and the flow from the pipe 2 into the pipe 3 is governed by the main valve 4. This valve is shown as having the upper valve member 5 and the lower valve member 6 which are arranged to close the openings in the pipe 2 to control the flow of fluid into the chamber 7.

It is desirable in hookups of this sort to provide a constant flow orifice plate such as 8 in the line so as to prevent certain fluctuations in pressure. This orifice plate is held in position by the flanges 9 and discharges into the low pressure line 10.

It seems obvious that when the valve 4 opens that the high pressure will flow into the chamber 7 and discharge through the orifice plate 10 into the low pressure chamber 11, and there will be a differential pressure between the chambers 7 and 11 due to the provision of orifice plate 8. It is to be understood that this orifice plate may be changed to provide any desired size of orifice.

The chamber 11 may be of considerable length and may embody a pipe of many miles in length, and it is desirable to arrange the valve 4 so that it will admit the necessary volume of fluid which will maintain a constant pressure on the end of the low pressure pipe of chamber 11.

If the flow from the chamber 11 were constant the problem would, of course, be very simple because the friction losses in the line 10 would be constant and with a constant volume a simple regulator would satisfactorily maintain a contant pressure. In practice and particularly in the distribution of gas for domestic and commercial consumption the volume consumed varies constantly from a minimum to a maximum peak load and this variation in consumption tends to reduce and increase the pressure in the outlet end of the low pressure pipe 10. To avoid placing regulators at the outlet end of the pipe 10 and to avoid carrying a higher pressure on the pipe 10 it is desirable to provide a regulator as the one herein disclosed which will control flow into the pipe 10 in such a manner that a constant pressure is maintained at the outlet end of the pipe 10, regardless of the volume of fluid passing through the line. In order to accomplish this it is necessary to compensate for the variation in friction loss in the line 10 due to the difference in volume flow therethrough.

The present invention contemplates controlling this volume flow and compensating for the frictional loss by taking advantage of the differential pressure in the chambers 7 and 11 on the upstream and downstream sides of the orifice plate 8, respectively.

The valve 4 is actuated by a stem 15 which is connected to a diaphragm 16 which is in turn normally urged upwardly as seen in Fig. 1 by a spring 17. This spring tends to hold the valves in closed position and the nuts 18 on the stem lock the diaphragm plate to the stem.

In order to open the valve 4 a control pressure chamber 20 is provided inside of the control housing 21 which encloses the diaphragm 16. The chamber 22 on the underside of the diaphragm 16 is also provided and is connected to chamber 11 through pipes 24 x 23 in order to supply the downstream pressure in chamber 11 to the under side of diaphragm 16 tending to close valve 4 with the assistance of spring 17, and a branch pipe 25 leads through a choke 25' in the pipe 25 into the chamber 20. Thus, any increase or reduction of pressure in the chamber 11 is instantly reflected in the chamber 22.

In order to provide a constant pressure in the control chamber 20 which opposes the pressure in chamber 22 and the pressure of the spring 17, a by-pass pipe 30 extends from the high pressure line 2 through the reducer or pilot valve 31 and the pipe 32 into the chamber 20. This pilot valve may be of any desired type which will maintain a constant and predetermined pressure upon the chamber 20, irrespective of the pressure which is present in the high pressure line 2. Valves of this type are well known and it is not believed necessary to explain the details thereof.

A valve of the general construction just described is disclosed and claimed in my co-pending application, Serial No. 735,589, filed July 17, 1934.

In the present invention it is desired to further control the flow of fluid through the valve 4 by compensating for friction loss in the discharge line and to accommodate variations in the volume flow of fluid. With this in mind the orifice plate 8 has been provided and an additional regulator diaphragm 35 has been attached to the mechanism. This diaphragm 35 is contained in the housing 36 which is entirely independent of the chambers 20 and 22 and the diaphragm 16.

The by-pass pipe 23 has a branch 37 thereon which leads into the low pressure regulator chamber 38, whereas the by-pass pipe 40 from the upstream chamber 7 has a branch 41 which leads into the high pressure regulator chamber 42. With this construction it seems obvious that the difference in pressure which is across the orifice plate 8 will also be present across the diaphragm 35, so that the normal tendency of such diaphragm as seen in Fig. 1 would be to move upwardly because the pressure in the chamber 7 is normally greater than the pressure in the chamber 11.

A stem 44 is connected to the diaphragm 35 and passes upwardly through the housing 36 where it is provided with a washer 46 which supports the lower end of a compression spring 47. This washer is adjustable on the stem to adjust the compression of the spring. The upper end of the spring 47 abuts across the end 48 of a sleeve 49 which extends downwardly around the spring and is fixed to a lever 50. This lever is disposed in a bracket 51 which is provided with a plurality of openings 52, any one of which may receive the pivot pin 53 upon which the lever 51 is fulcrumed. It seems apparent that when the diaphragm 35 moves upwardly that there will be a corresponding upward movement of the stem 44 which will result in a tendency to compress the spring 47. This tendency is immediately transmitted to the housing 49 and tends to pivot the lever 50 about the pivot pin 53. The position of the spring 47, however, damps the action of the diaphragm 35 and results in cushioning of the action thereof. The left hand side of the lever 50 carries a housing 56 which confines a compression spring 55 somewhat similar to the spring 47. This spring 55 abuts against the adjustable plug 57 carried by the housing 56 and has its lower end abutting against a washer 58.

The outer rim of this washer abuts against a ring on the bottom of housing 56. The upper end of the stem 59 passes through a hole in the center of the washer 58 and a nut on stem 59 abuts against the bottom side of the washer 58. This nut is used to adjust the distance from the washer 58 to washer 62. In normal operation the spring 55 has no function except to hold washer 58 firmly against the bottom of case 56. However, when the downward pressure of the left hand end of lever 50 becomes greater than the tension on spring 55, which is adjusted by plug 57, the housing 56 will move downward around washer 58 until lever 50 rests on top of the stop post 54. With this construction the maximum pressure that can be exerted on the stem 59 is limited to any desired pressure by plug 57.

Figure 5:
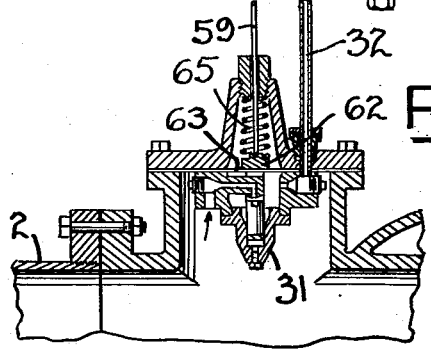
Fig. 5 shows an arrangement of the reducer valve which has been applied directly to the pipe line so that it will not be subjected to freezing because of the sudden changes in temperature.

The stem 59 is slidable in the bonnet 60 which is a part of the reducer valve 31 and has its lower end position directed against the plate 62 which rests on the diaphragm 63 of the reducer valve as seen in Fig. 5.

It will be noted, however, that the stem 59 is applied to abut against the plate 62 only when it moves downwardly a sufficient distance to contact the plate but is free to move upwardly away from the plate, depending upon the movement of the diaphragm 35. A small coil spring 65 normally tends to hold the plate 32 against the diaphragm 63.

The reducer valve 31 is so arranged that it will admit a predetermined pressure to the chamber 20 through the pipe 32 when in its predetermined set position with the position of the diaphragm 35 and its associated mechanisms. In constituting the stem 59, the position of the diaphragm 63 in the regulator valve may be varied so as to increase the pressure which was thus constant by an amount depending upon the pressure applied to the diaphragm 63 by the stem 59. As an example, if the diaphragm 35 is in the position shown in Fig. 1 the springs 47 and 55 and the lever 50 will be such that the stem 59 does not contact the plate 62 and the reducer valve will apply constant pressure to the chamber 20. If, however, the diaphragm 35 did move upwardly as seen in Fig. 1, the spring 47 would be compressed and the lever 50 would be tilted in a counterclockwise direction and tend to move the stem 59 downwardly against the plate 62 and cause depression of the diaphragm 63. This movement would tend to open the reducer valve slightly so as to increase the pressure from the high pressure line into the control valve 20 in proportion to the amount of downward movement of the stem 59. In this manner the amount of increase applied to the control chamber 20 is proportional to the amount of movement of the diaphragm 35.

If the consumption from the chamber 11 increases the pressure on the outlet end of the line will drop, tending to cause an increase in the velocity of the flow of fluid from the chamber and reduction in the pressure in the chamber 11 and the by-pass pipes 23, 24 and 37 so that there would be a consequent reduction in the regulator chamber 22.

This reduction in pressure in chamber 22 would unbalance the condition in chambers 20 and 22, since valve 31 tends to hold the pressure in the chamber 22 constant. This would in turn cause the valve 4 to further open, allowing more gas to pass into chamber 7, so as to increase the difference in pressure in chambers 7 and 11 across the orifice 8.

A greater differential would be required to force the additional amount of gas through the orifice 8, and, since the pressure in chamber 38 remains the same as in chamber 11, and the pressure in chamber 42 tends to stay the same as the pressure in chamber 7, additional gas flowing through the orifice 8 would cause the difference between the pressures in chambers 42 and 38 to increase, tending to raise the diaphragm 35 and compress spring 47. This in turn tends to tilt the lever 50 and press down on stem 59 which tends to load the valve 31. This increases the pressure in chamber 20, causing valve 4 to open further. This increases the flow again and tends to repeat the operation and would continue to build up the pressure.

To prevent this occurrence the spring 47 and choke 75 have been provided. The spring 47 is provided so that the diaphragm 35 will have to travel upward some distance before a given amount of pressure can be exerted against the lever 50. In order for the diaphragm 35 to travel upward the space it displaces or the amount of area that the chamber 42 increases has to be filled with gas from a pressure greater than that in chamber 38, and in this way we have a large enough volume of gas entering the chamber 42 so that it is easy to control the speed with which the chamber 42 will fill and the diaphragm will rise by the use of choke 75. In this way the pressure is not allowed to rise any farther than the line 11 can be filled to its extremity. The differential across the diaphragm 35 will lag behind the differential across orifice 8 to such an extent that when the line is filled to the desired pressure and the valve 4 closes enough so that it just supplies enough gas to maintain this pressure, there will still be enough differential across the orifice 8 to maintain the differential across diaphragm 35 to the point it has risen.

Figure 4:
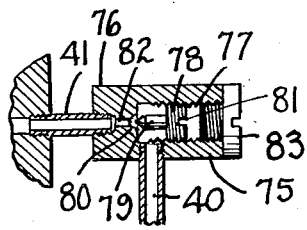
Fig. 4 is an enlarged view of the choke arrangement which may be used to adjust the lag to be obtained.

The choke 75 is shown in detail in Fig. 4 and embodies a casing 76 which receives the pipe 40 on one side thereof and the pipe 41 on the opposite side. This casing is internally threaded at at 77 and receives the plug 78 which is threaded therein. This plug carries a needle valve 79 which is applied to encase the seat 80 in the casing 76. A slot 81 in the head of the plug 78 is provided so that a suitable tool may be used to turn the plug and in this manner adjust the size of the opening and consequently the flow through the choke portion 82 in the casing 76. A closure cap 83 serves to close the casing 76.

If the diaphragm 35 moves upwardly it increases the size of the chamber 42 and of course increases the area thereof. This increase in area, if the same volume of fluid were present, would of course result in the reduction of the unit area pressure so that to some extent the reduction in the pressure in the chamber 38 due to the drop of the pressure in the chamber 11 is compensated for in this manner, but on the other hand before the pressure in the chamber 42 can build up to cause an additional movement of the diaphragm 35 or to maintain the diaphragm in such raised position, it is necessary that a flow occur through the choke 75 so that the choke 75 thereby serves a third purpose of further damping the action of the diaphragm 35.

In Fig. 2 a form of the present invention is illustrated which can be applied to an ordinary type of weight regulator or control valve. Such a valve is illustrated generally at 90 and includes the housing 91 wherein a diaphragm 92 tends to close the valve 90 in accordance with an applied weight 93 which actuates the stem 94 by means of the lever 95, which is pivoted at 96 so as to operate the stem 94, which is fulcrumed to the lever at 97.

The present invention has been attached to the lever 95 by the ring 96 and the regulator apparatus is carried by the support 97 and includes the housing 98.

In Fig. 1 the spring 17 tends to normally keep the valve 4 closed when the pressure in the chamber 22 is equal to that applied to the control chamber 20 through the reducer valve 31. In Fig. 2, however, the valve 90 has a normal tendency to open due to the weight 93 so that if the flow through valve 31 and line 32 into chamber 20 should be shut off then the pressure in chambers 20 and 22 would equalize, then the regulator mechanism would be inoperative and the weight 93 would open the valve 90 and allow a volume to flow into the discharge line. The weight 93 could be said to predetermine the amount so that at least pressure could always be discharged in the low pressure line so long as it is present in the high pressure line.

The general arrangement and assembly of the regulator mechanism in Fig. 2 is the same in Fig. 1 except the spring 17 of Fig. 1 is omitted from Fig. 2 and since the diaphragm 92 tends to close the valve 90, the spring 17 is not needed.

Figure 3:
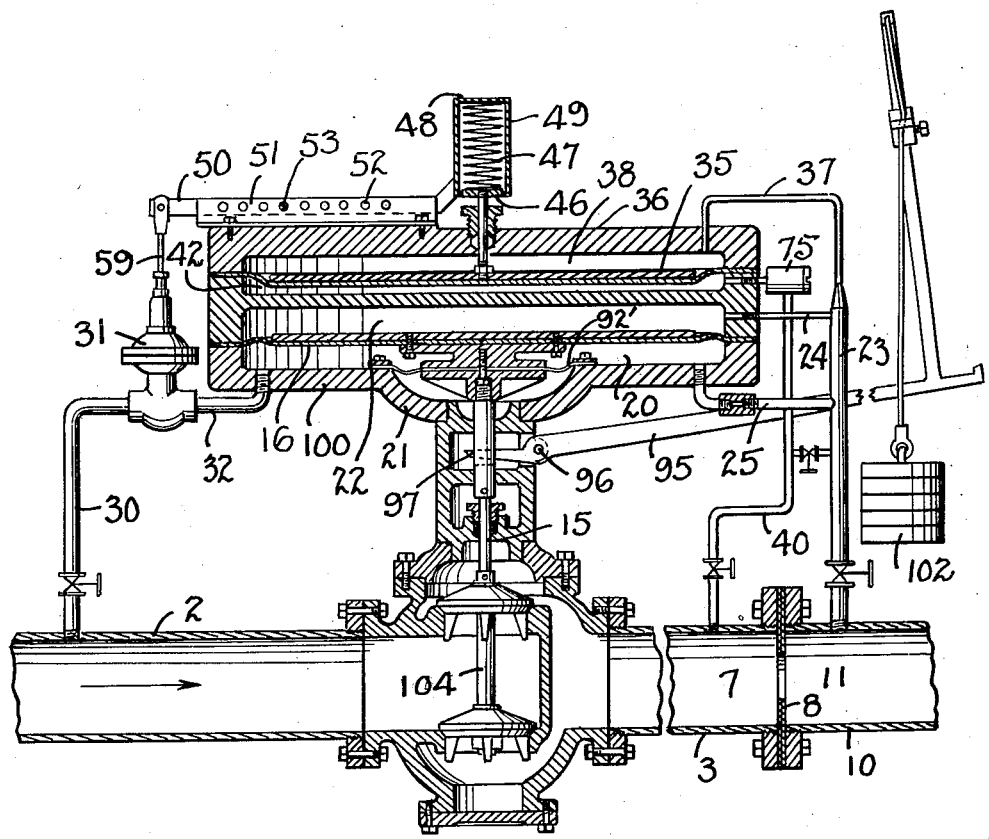
Fig. 3 shows a slightly different form of the invention wherein the mechanism has all been consolidated in combination with a balance weight type of valve.

Fig. 3 shows a compact arrangement of structure which in operation is substantially the same as Fig. 2. The regulator mechanism is incorporated in a housing 100 and the weight 102 serves the same purpose as the weight 93 in that it tends to open the valve 104 when the pressure in the line 11 drops below the valve set on the pilot valve. The small diaphragm 92 serves the same purpose as the diaphragm 92 of Fig. 2. The chambers 20 and 22 of Fig. 1 are, of course, reversed because this is an upward opening valve as distinguished from the two opening valves in Fig. 1. The other arrangements of structure are similar to those previously described and are used in substantially the same combination.

What is claimed is:

1. A system for regulation of a variable flow of fluid through pipe lines where a constant pressure is to be maintained at the discharge when there is a variation in friction loss in the line due to the variation in flow comprising, a main valve, a diaphragm to actuate said valve, means connected to the high pressure side of said valve to apply a portion of such high pressure to said diaphragm, an orifice plate on the downstream side of said valve, means to apply with such pressure the amount of the pressure on the downstream side of said orifice plate, and additional means operable as a function of the variation in differential pressure across said orifice plate to vary the pressure tending to actuate said diaphragm.

2. A system for regulation of a variable flow of fluid through pipe lines where a constant pressure is to be maintained at the discharge when there is a variation in friction loss in the line due to the variation in flow comprising, a main valve, a diaphragm to actuate said valve, means connected to the high pressure side of said valve to apply a portion of such high pressure to said diaphragm, an orifice plate on the downstream side of said valve, means to apply with such pressure the amount of the pressure on the downstream side of said orifice plate, and additional means operable as a function of the variation in differential pressure across said orifice plate to vary the pressure tending to actuate said diaphragm, said additional means including a choke to delay the removal of such variation in pressure whereby to compensate for friction losses in the pipe line by passing an increased volume of fluid through said main valve.

3. The combination in a flow line of an orifice to govern the flow therethrough, a valve to admit fluid to the upstream side of said orifice, a diaphragm to control the movement of said valve, means to apply the pressure from the downstream side of said orifice to both sides of said diaphragm, and additional means to vary the pressure on said diaphragm tending to open said valve in accordance with variation in the differential pressure across said orifice.

4. The combination in a flow line of an orifice to govern the flow therethrough, a valve to admit fluid to the upstream side of said orifice, a diaphragm to control the movement of said valve, means to apply the pressure from the downstream side of said orifice to both sides of said diaphragm, and additional means to vary the pressure on said diaphragm tending to open said valve in accordance with variation in the differential pressure across said orifice, said additional means including a choke to damp the effect of the variation in pressure from the upstream side of said orifice.

5. The combination with a diaphragm operated main control valve and reducer valve to apply a constant pressure to said diaphragm of a regulator device operable in accordance with the volume of fluid and rate of flow thereof to add pressure to said diaphragm to accommodate the variation in rate of flow and the volume of fluid, said device including a diaphragm, means to apply a differential pressure to said diaphragm, a lever bar, spring means connecting said bar to said diaphragm, and a push rod to contact said reducer valve to increase the applied pressure to said main valve.

6. The combination with a diaphragm operated main control valve and reducer valve to apply a constant pressure to said diaphragm of said main valve of a regulator device operable in accordance with the volume of fluid and rate of flow thereof to add pressure to said diaphragm to accommodate the variation in rate of flow and the volume of fluid, said device including a diaphragm, means to apply a differential pressure to said diaphragm, a lever bar, spring means connecting said bar to said diaphragm, and a push rod to contact said reducer valve to increase the applied pressure to said main valve, said differential pressure means being operable as a function of the change in rate and volume of flow of the fluid.

7. The combination with a diaphragm operated main control valve and reducer valve to apply a constant pressure to said diaphragm of a regulator device operable in accordance with the volume of fluid and rate of flow thereof to add pressure to said diaphragm to accommodate the variation in rate of flow and the volume of fluid, said device including a diaphragm, means to apply a differential pressure to said diaphragm, a lever bar, spring means connecting said bar to said diaphragm, and a push rod to contact said reducer valve to increase the applied pressure to said main valve, said differential pressure means being operable as a function of the change in rate and volume of flow of the fluid and including a choke in the higher pressure side thereof to obtain a lag in the operation to compensate for friction losses due to the change in the rate and volume of flow.

8. In a regulator for control valves having a diaphragm for operation thereof, a housing thereror, a valve to reduce pressure to the diaphragm, a second diaphragm, means connecting said diaphragm to said reducer valve to supplement the normal operation of the reducer valve, means to control the movement of said second diaphragm comprising an orifice and a pipe to apply the variation in pressure at said orifice to said diaphragm, and a choke in said pipe to effect a lag in the application of variation in the pressure.

WILLIAM R. KING.